United States Patent
Su

(10) Patent No.: US 6,775,467 B1
(45) Date of Patent: Aug. 10, 2004

(54) DVD PLAYBACK SYSTEM CAPABLE OF PLAYING TWO SUBTITLES AT THE SAME TIME

(75) Inventor: Chun Chia Su, Hsin-Tien (TW)

(73) Assignee: Cyberlink Corporation, Taipei (TW)

( * ) Notice: Subject to any disclaimer, the term of this patent is extended or adjusted under 35 U.S.C. 154(b) by 752 days.

(21) Appl. No.: 09/630,294

(22) Filed: Aug. 1, 2000

(30) Foreign Application Priority Data

May 26, 2000 (TW) ........................................ 89110234

(51) Int. Cl.$^7$ .............................. H04N 5/85; H04N 7/04
(52) U.S. Cl. ...................... 386/125; 386/126; 386/105
(58) Field of Search ................................ 386/125, 124, 386/126, 45, 105, 106, 95, 97, 104, 1, 46, 4, 39, 40, 52; H04N 5/85, 7/04

(56) References Cited

U.S. PATENT DOCUMENTS 5,999,695 A  * 12/1999 Hirayama et al. ............ 386/97
6,658,160 B1 * 12/2003 Winter et al. ............... 382/245

FOREIGN PATENT DOCUMENTS

| JP | 2000-175154 | 6/2000 |
| JP | 2001-036865 | 2/2001 |

* cited by examiner

Primary Examiner—Robert Chevalier
(74) Attorney, Agent, or Firm—Fish & Richardson P.C.

(57) ABSTRACT

A DVD playback system, associated with a DVD storage media. It comprises a loader, a system parser, a decoding device and a video/sub-picture composer. The loader system is for reading the digital data tagged with stream IDs from the DVD storage media, a primary sub-picture control signal (SP1) from the navigator, and a secondary sub-picture control signal (SP2) from the user interface. The system parser and the decoding device are for dividing the digital data into an video stream, at least one audio stream, a primary sub-picture stream and a secondary sub-picture stream and then decoding each individual stream separately into video signal, audio signal and sub-picture signal. The sub-picture signal comprises of aprimary sub-picture and a secondary sub-picture signals; The video/sub-picture composer is for mixing the video signal and the sub-picture signal to generate the video output, while the audio output module is for generating the audio output.

8 Claims, 9 Drawing Sheets

The Extended Sub-Picture
Decoder operates according
to the following table.

The operation of the Sub-Picture Decoder

| Sub-Picture | | Decoder | | Composer |
|---|---|---|---|---|
| Primary | Secondary | Primary | Secondary | |
| OFF | N/A | OFF | OFF | OFF |
| ON | OFF | ON | OFF | OFF |
| ON | ON | ON | ON | ON |

Fig. 4

DVD PLAYBACK SYSTEM CAPABLE OF PLAYING TWO SUBTITLES AT THE SAME TIME

BACKGROUND OF THE INVENTION

1. Field of the Invention

The present invention relates to a digital versatile disc (DVD) playback system. Specifically, it relates to a multimedia DVD playback system capable of playing two subtitles at the same time.

2. Description of the Related Art

Per U.S. Pat. No. 5,978,916, a DVD stores video, audio and compressed data in a multimedia storage format. A DVD decoder is utilized in the playback of video, audio and subtitles (hereinafter sub-picture) data files. In the case of video files, the encoded video data format conforms to the Moving Picture Experts Group (MPEG) specification.

Present DVD playback systems feature many playback capabilities. For example, users can select such functions as audio language, sub-title language, viewing angle, and aspect ratio. Moreover, DVD playback systems have additional functions such as video signal output or audio signal output.

In U.S. Pat. No. 5,907,658, a DVD playback system may display one subtitle from a list of options. To accommodate international audiences, one DVD title may include multiple subtitles in different languages with the DVD playback system providing the capability to access different subtitles based on locale or user defined options.

In FIG.1, the digital data read from a DVD is stored in a buffer memory (not shown). System parser 15 divides the digital data into video, audio, and sub-picture streams according to stream IDs using an eight digit binary flag format. Despite the existence of more than one stream for audio and sub-picture data, only one stream (per function) is used for decoding and output. The specified, functional data streams are then transferred to video decoder 2, a sub-picture decoder 6, and audio decoder 4 respectively. Audio decoder 4 decodes the selected audio stream and outputs the audio frames to audio output module 5 to generate acoustic sound/music output. Similarly, video decoder 2 decodes the video stream and generates video frames while sub-picture decoder 6 decodes the selected sub-picture stream and generates sub-picture frames. Both video and sub-picture frames are then transferred to and mixed by video/sub-picture composer 8. The mixed frames are then transferred to video output module 3 and displayed on-screen.

With this conventional DVD playback system, users can only choose a single sub-picture stream to be displayed at any given time. For example, sub-picture stream 0 is the English subtitle and sub-picture stream 1 is the French subtitle. When the user chooses the English subtitle, the sub-picture stream 0 (English) is automatically selected by system parser 15 and transferred to sub-picture decoder 6 for decoding. In this example, sub-picture stream 1 (French) would be discarded. The result being, only the English subtitle is displayed on-screen.

One disadvantage of conventional DVD playback systems is that even if a DVD title provides subtitles for different languages and the capability to select subtitle language, it can only display one subtitle at a time. Hence, conventional DVD playback systems do not/cannot meet the demands of a bilingual teaching environment, for example.

SUMMARY OF THE INVENTION

One objective of the present invention then is to provide a DVD playback system capable of playing two subtitles simultaneously. For example, a user may choose to display two different subtitles, one being the user's native language and the other being a foreign language. The purpose being the user can cross-reference the two subtitles in an effort to learn the foreign language.

The present invention achieves the above objective by providing a method that allows DVD playback systems to play two subtitles simultaneously. Refer to FIG. 2. In the prior art, Navigator 20 does not accept two sub-picture streams concurrently. It decides on and selects one sub-picture stream ID corresponding to the title setting selected by the user and sends that ID to Loader System 32. The present invention instead provides a new, second control path (in addition to the original one controlled by Navigator 20) that allows the user to define other sub-picture stream IDs that can be directly assigned from User. Interface Control Unit 24 to Loader System 32. Loader System 32 in-turn directs System Parser 34 to deliver these user selected sub-picture streams to Sub-Picture Decoder 46 as defined by the two sub-picture stream IDs (e.g., two different sub-picture frames are decoded from the two sub-picture streams). The sub-picture corresponding to the first stream ID from Navigator 20 is called the Primary Sub-Picture and another sub-picture corresponding to the stream ID from User Interface Control Unit 34 is called the Secondary Sub-Picture. The Primary Sub-Picture and the Secondary Sub-Picture are first combined in a mixed sub-picture frame. The mixed sub-picture frame is then mixed with the video frame by Video/SP composer 48. The Video/SP mixed frame is then delivered to Video Output module 36 and displayed on-screen. Audio output proceeds concurrently.

In summary, the DVD playback system of the present invention is capable of playing two subtitles simultaneously and has the following features:

1. The end-user fully controls selection of the two subtitles including enable or disable as well as language(s).
2. The two subtitles will be displayed correctly and synchronously.
3. The playing of two subtitles will not effect or delay the playing of video or audio streams, thus be displayed in real-time.

BRIEF DESCRIPTION OF THE DRAWINGS

These and other features, aspects and advantages of the present invention as well as the structure and operation of various embodiments thereof will become readily apparent through reference to the following detailed description of a presently preferred, illustrative embodiment. Further, when read in conjunction with the accompanying drawings, it is to be understood that reference numbers indicate identical or functionally similar elements throughout the enumerated figures. The drawings referred to herein should be understood as not being drawn to scale except where specifically noted. The emphasis instead being placed upon illustrating the principles of the present invention. In the accompanying drawings:

FIG. 4 is the reference table for operation of the sub-picture decoder.

DETAILED DESCRIPTION OF THE PREFERRED EMBODIMENTS

Reference is now made in detail to an embodiment of the present invention that illustrates the best mode presently contemplated by the inventor(s) for practicing the present invention.

Figure 1:
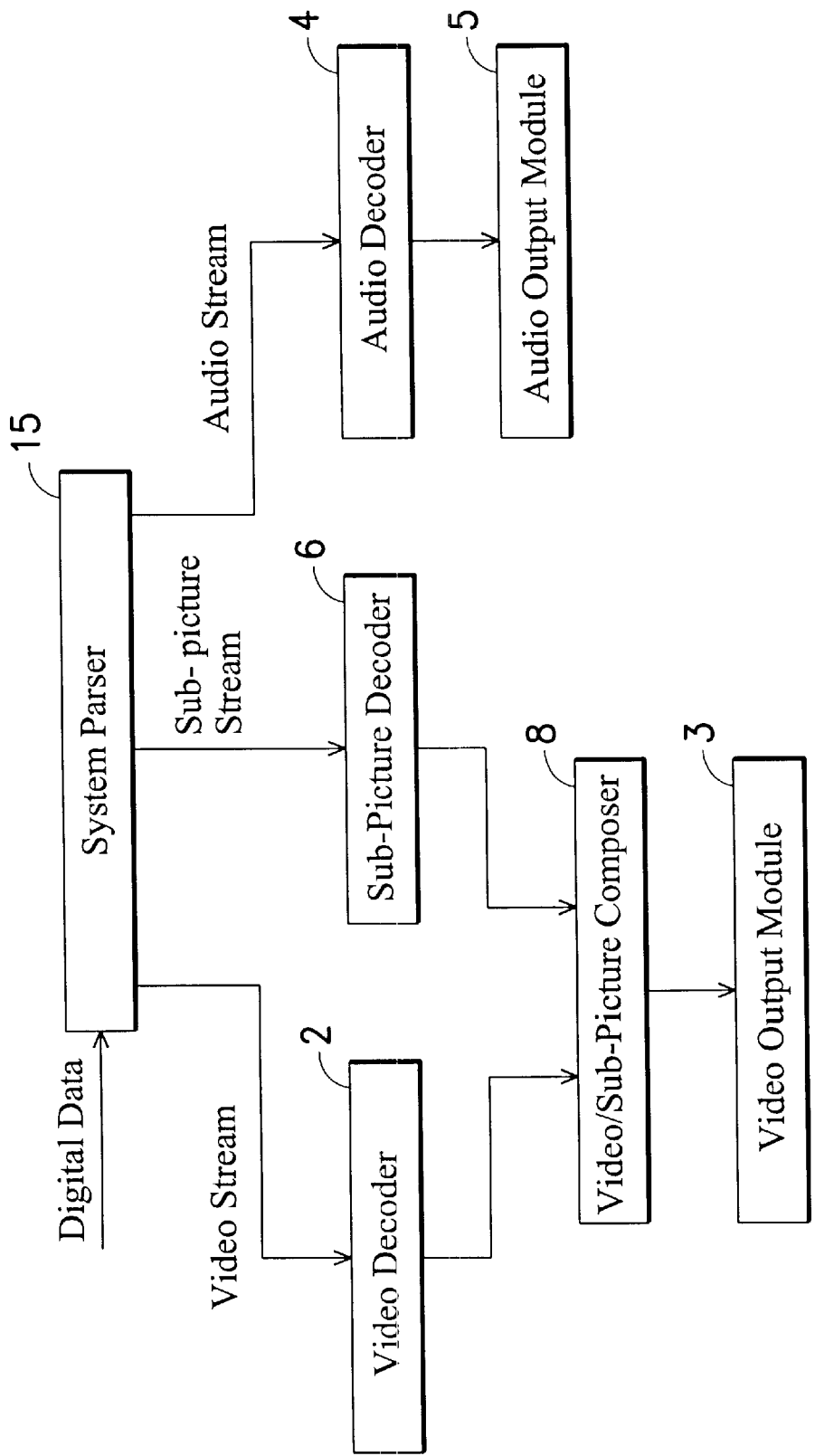
FIG. 1 represents the architecture of a conventional DVD playback system.
Figure 2:
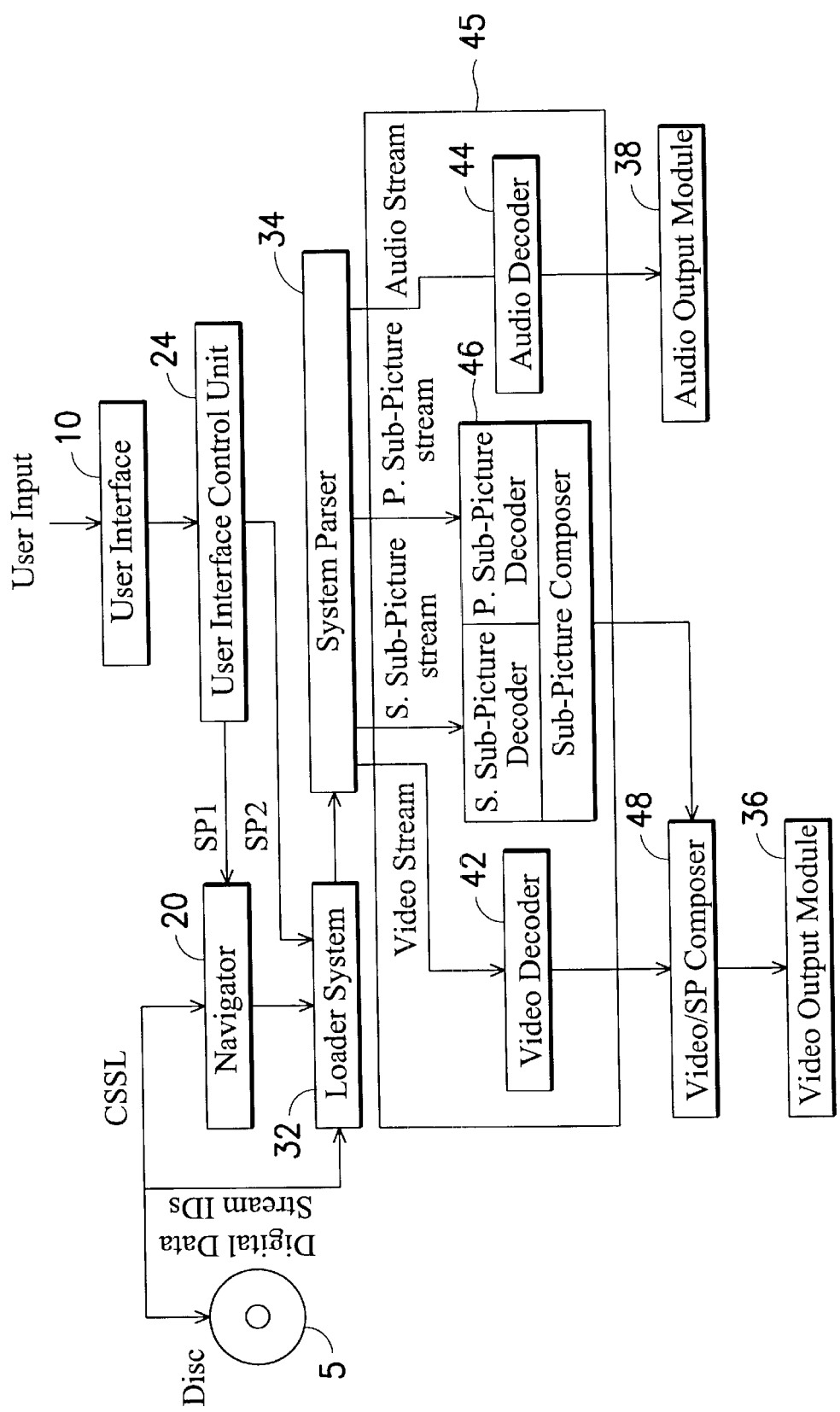
FIG. 2 represents the architecture of the DVD playback system of the present invention.
Figure 3:
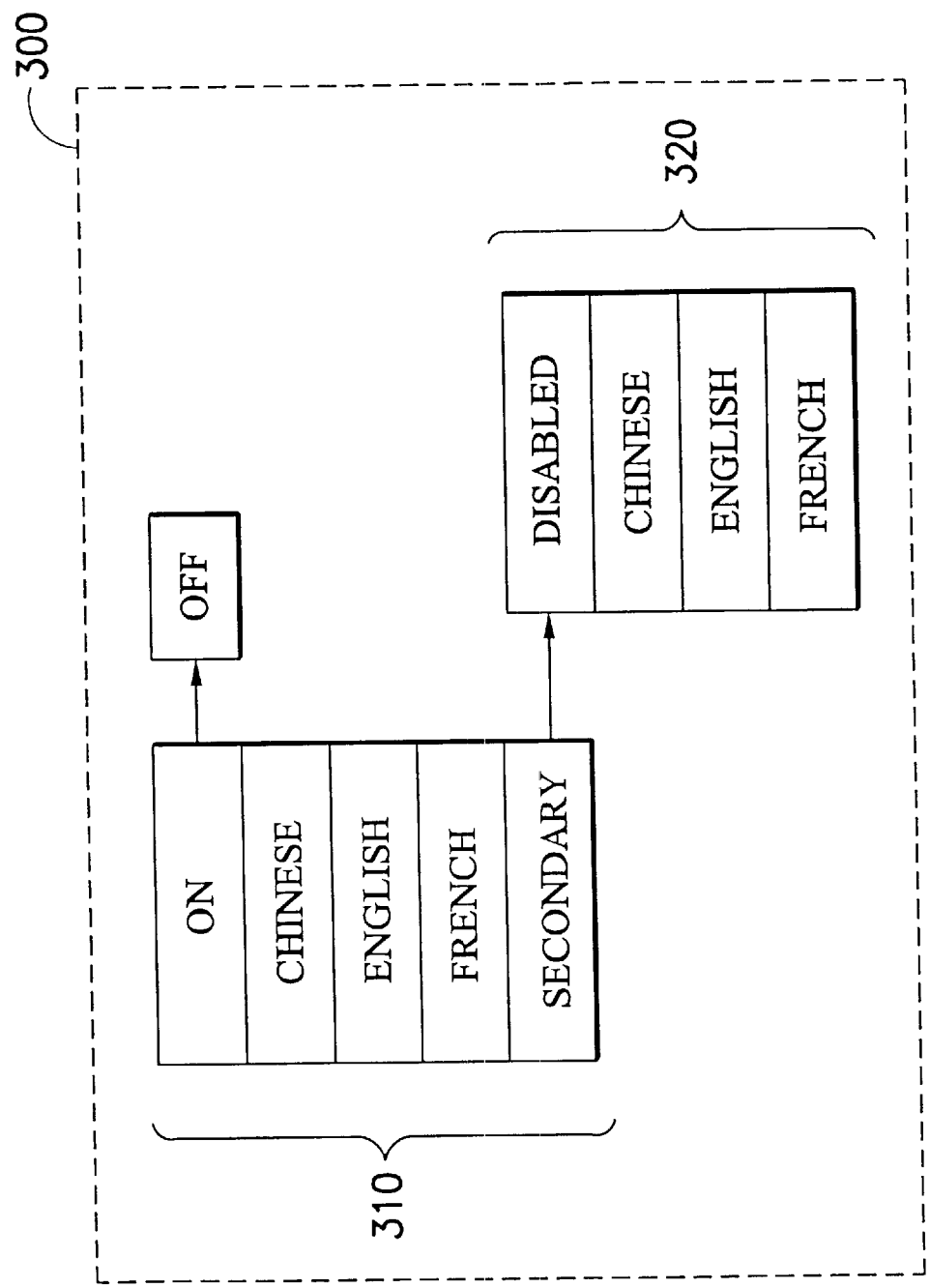
FIG. 3 shows the control menu of user interface sub-picture selections found in the DVD playback system of the present invention.

FIG. 2 represents the DVD playback system of the present invention suitable for the playback of DVD 5 comprising the following components:

Navigator 20 for reading the control signal selection list (CSSL) from the DVD storage media (disc 5). A user interface 10, providing access to the control signal selection list CSSL displaying a menu 300 as shown in FIG. 3, allowing for selection of a primary sub-picture control signal (SP1) and a secondary sub-picture control signal (SP2). The menu of user interface 10 shown in FIG.3 comprising a primary sub-picture menu 310 and a secondary sub-picture menu 320. A user may choose from primary sub-picture menu 310 and secondary sub-picture menu 320 thereby emitting primary sub-picture signal (SP1) and secondary sub-picture signal (SP2). For example, when a user chooses OFF from the menu 310, a sub-picture is not used nor displayed. In this example, the primary sub-picture control signal (SP1) disables sub-picture decoder 46 (a mechanism which will be described later). Conversely, when a user chooses ON from menu 310, the sub-picture is enabled allowing the user to choose a language as the primary sub-picture signal (SP1). Hence, if Chinese is chosen as the first sub-title, the primary sub-picture control signal (SP1) will enable the primary sub-picture decoder of sub-picture decoder 46 (again, a mechanism which will be described later).

If a user chooses the "Secondary" function from menu 310 in FIG. 3, secondary sub-picture selection menu 320 is opened. A user can then choose a language as the secondary sub-picture from secondary sub-picture selection menu 320. Hence, if English is chosen as the secondary sub-picture, the secondary sub-picture control signal (SP2) enables the secondary sub-picture decoder in sub-picture decoder 46 (again, a mechanism which will be described later).

Lastly, if a user chooses the "DISABLED" from menu 320 in FIG. 3, the secondary sub-picture will not be displayed on-screen and secondary sub-picture control signal (SP2) will disable the secondary sub-picture decoder in sub-picture decoder 46 (again, a mechanism which will be described later).

The design of a conventional Navigator is standardized and receives only one sub-picture stream. The loader system receives the first subtitle control signal (primary sub-picture control signal SP1) from the Navigator. For the secondary sub-picture, the embodiment of the present invention provides a new path enabling the loader system to receive the second subtitle control signal (secondary sub-picture control signal SP2) from the user interface. When a user chooses to enable both the primary sub-picture and the secondary sub-picture, user interface 10 passes the signals through user interface control unit 24 onto navigator 20, which reads primary sub-picture control signal SP1, and loader system 32, which reads secondary sub-picture control signal SP2. In the embodiment of the present invention, loader system 32 reads the digital data and data stream IDs from DVD storage media 5. Loader system 32 also receives primary sub-picture control signal SP1 from Navigator 20, and secondary sub-picture control signal SP2 from User Interface control Unit 24.

Loader system 32 controls system parser 34 which parses, unscrambles, and delivers the digital data. System parser 34 divides the digital data into video stream(s), audio stream(s) and sub-picture stream(s) according to stream IDs (if any). Navigator 20 decides which streams should be used as video, audio and sub-picture for the current presentation. System parser 34 then respectively delivers the corresponding streams to video decoder 42, audio decoder 44 and sub-picture decoder 46 of component's decoding device 45. The sub-picture stream(s) delivered by system parser 34 is comprised of the primary and secondary sub-picture stream (s) (if any). The audio stream is decoded by audio decoder 44 and sent to audio output module 38 which outputs any existing digital audio signals. The video stream is decoded by video decoder 42 and any decoded video frame(s) is/are outputted to video/sub-picture composer 48. The sub-picture streams are decoded by sub-picture decoder 46 based on any existing sub-picture control signal(s) SP (SP1 and/or SP2). If a secondary sub-picture is used, the two decoded sub-picture frames are first mixed into a single sub-picture frame. This sub-picture frame is then outputted to video/sub-picture composer 48.

Subsequently, the digital video and sub-picture frames are mixed by video/sub-picture composer 48 and outputted to video output module 36 for video output.

FIG. 4 depicts a table describing the operation behavior of sub-picture decoding module 46 (from FIG. 2) in the DVD playback system of the present invention. The first line of the table (located below the columns labeled Primary and Secondary) displays the result if a user turns off the sub-picture from sub-picture selection menu 310 shown in FIG. 3. Here, the primary sub-picture decoder, the secondary sub-picture decoder and the sub-picture composer are all disabled.

The second line of the table displays the result if a user turns on the sub-picture from sub-picture selection menu 310 but disables the secondary sub-picture from secondary sub-picture selection menu 320. Here, the primary sub-picture decoder is enabled while the secondary sub-picture decoder and the sub-picture composer are disabled.

The third line of the table displays the result if a user turns on the sub-picture and selects a secondary sub-picture. Here, the primary sub-picture decoder, secondary sub-picture decoder 45 and the sub-picture composer are all enabled.

Figure 5:
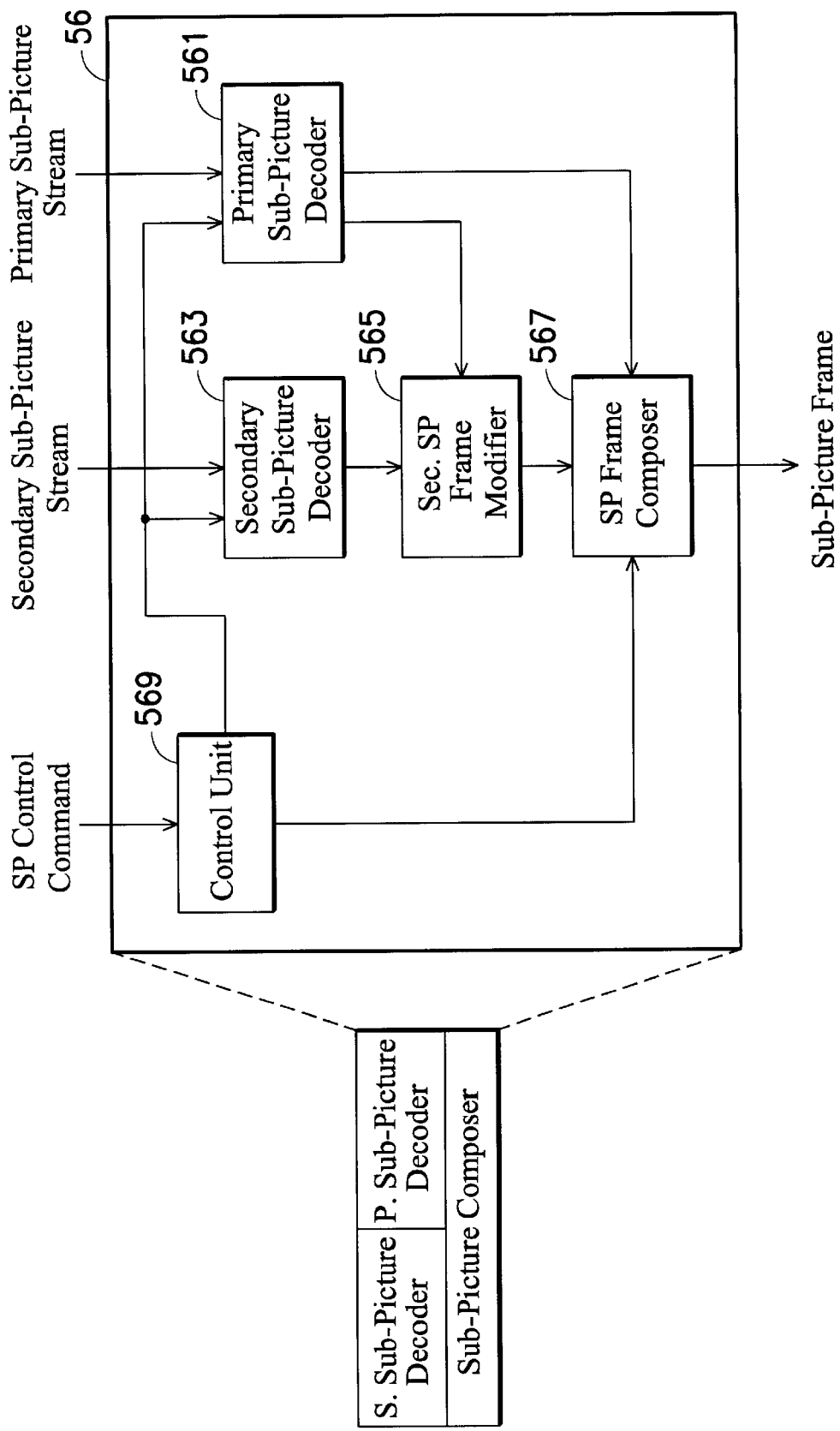
FIG. 5 represents the architecture of the sub-picture decoder found in the DVD playback system of the present invention.

FIG. 5 depicts the sub-picture decoder of a DVD playback system using the present invention. Control unit 569 determines whether to enable primary sub-picture decoder 561 and secondary sub-picture decoder 563 as directed by the sub-picture control signal SP (SP1, SP2). If the primary sub-picture is enabled, primary sub-picture decoder 561 receives the primary sub-picture stream and outputs a sub-picture frame. The secondary sub-picture decoder 563 behaves similarly. Any secondary sub-picture frame would be processed by secondary sub-picture frame modifier 565 to adjust the on-screen display location. The need to adjust the location of a secondary sub-picture takes into consideration that sub-pictures for different languages of the same DVD title may be displayed in similar on-screen positions and/or are of similar size. Without modification, the two sub-pictures could interfere with one another. Hence, secondary sub-picture frame modifier 565 adjusts the display location of the secondary sub-picture relative to the size and position of both the primary and secondary sub-picture frames (the method used by the secondary sub-picture frame modifier to adjust the display location of the secondary sub-picture will be described later). Next, the primary sub-picture frame and any adjusted secondary sub-picture frame would be delivered to sub-picture composer 567. Note that it is not necessary for the primary and secondary sub-picture frames to be delivered to sub-picture composer 567 simultaneously. Once a request to update the primary or adjusted secondary sub-picture frame is delivered to sub-picture composer 567, sub-picture composer 567 generates a mixed sub-picture frame composed of both the primary and secondary sub-picture frames. Alternatively, the sub-picture frame composer can just pass the primary sub-picture frame as the resulted sub-picture frame according to the sub-picture control signal SP of the control unit 569.

Figure 6:
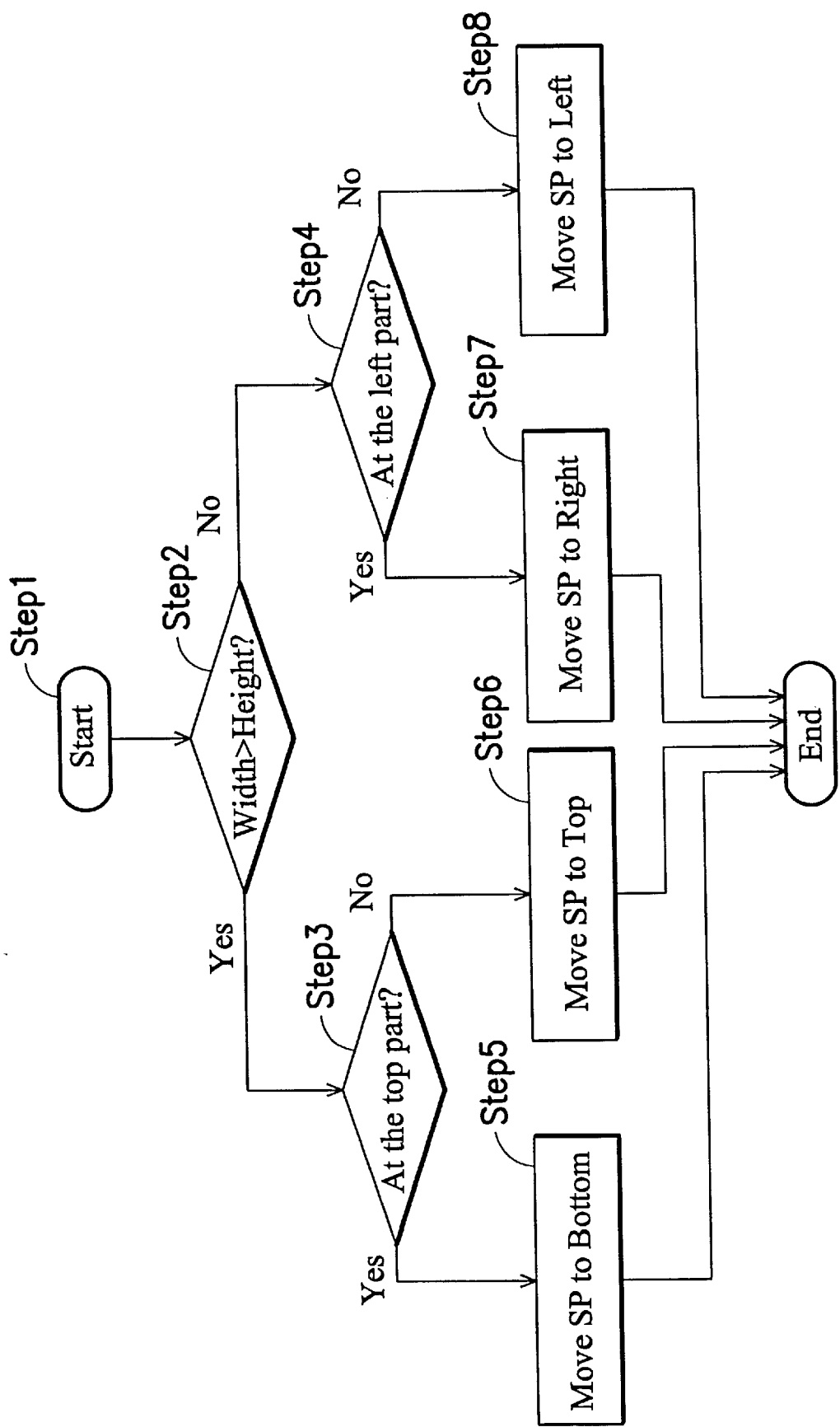
FIG. 6 represents a block diagram of the secondary sub-picture frame modifier found in the DVD playback system of the present invention.

FIG. 6 represents a block diagram of secondary sub-picture frame modifier 565 found in the DVD playback system of the present invention. When the secondary sub-picture frame modifier receives the decoded digital secondary sub-picture signal, step 1 is carried out and the start command is activated. Next, step 2 is implemented wherein secondary sub-picture modifier 565 determines whether the width of the digital secondary sub-picture signal is greater than its height. If determined as "Yes", step 3 is carried out to determine whether the primary sub-picture should be displayed on top of the sub-picture frame. If the primary sub-picture is displayed on top of the sub-picture frame, step 5 is implemented wherein the secondary sub-picture is adjusted to display at the bottom of the sub-picture frame. In the opposite case, the secondary sub-picture is displayed on top of the sub-picture frame.

Returning to step 2, if the width of the digital secondary sub-picture signal is smaller than its height, step 4 is implemented to determine if the primary sub-picture is to the left of the sub-picture frame. If "yes", the secondary sub-picture signal is adjusted to the right of the sub-picture frame. In the opposite case, the secondary sub-picture signal is displayed to the left of the sub-picture frame. Displacement of the secondary sub-picture is determined based upon the principle that overlapping of the primary sub-picture should be avoided as much as possible.

Figure 7:
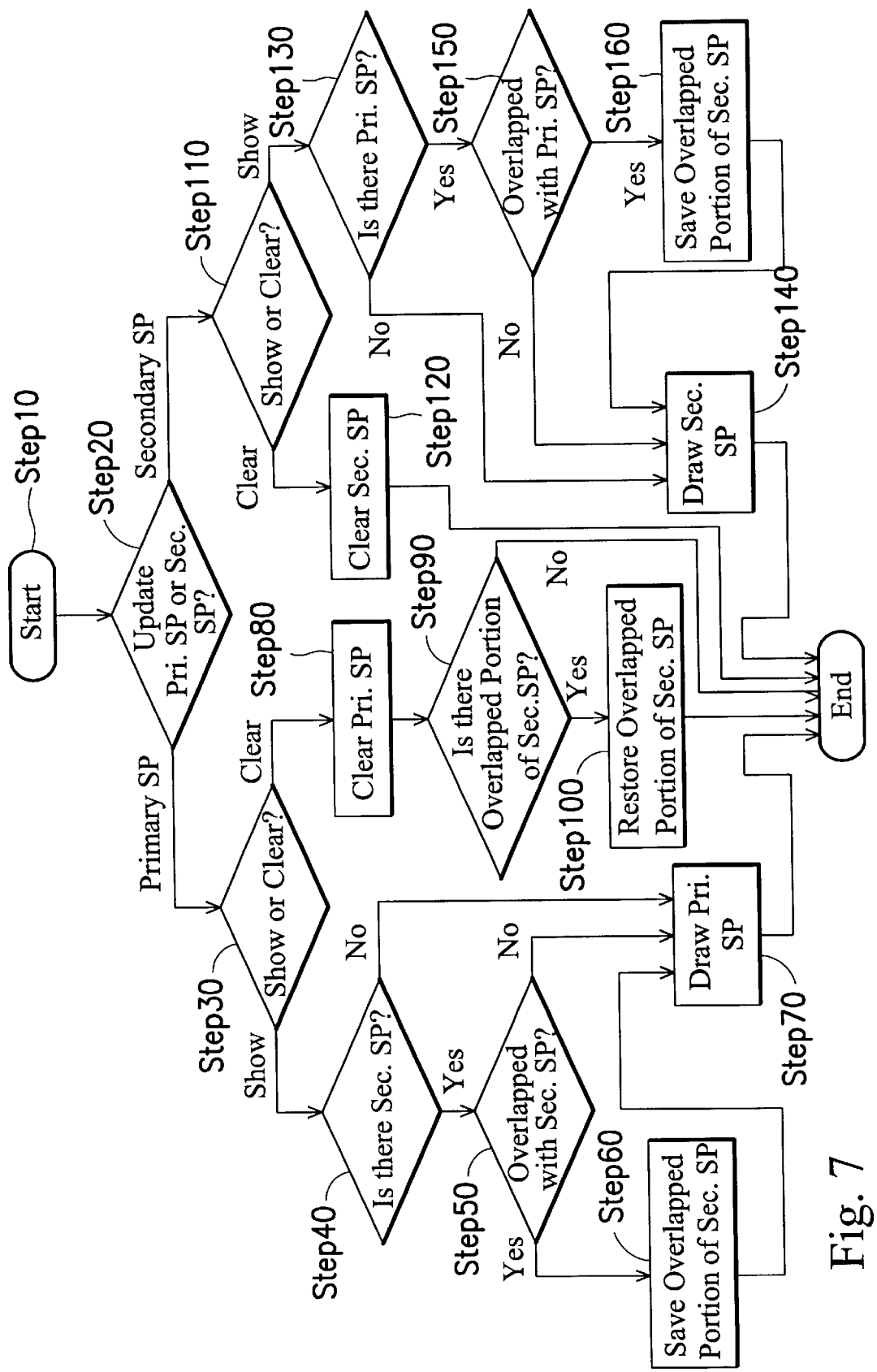
FIG. 7 represents a schematic block diagram of the sub-picture composer found in the DVD playback system of the present invention.

FIG. 7 represents the schematic block diagram of the sub-picture composer found in the present invention of a ADVD playback system. The basic concept of the sub-picture composer is to generate a mixed sub-picture frame with no interference or overlap of the primary and secondary sub-pictures, if possible. If overlap is unavoidable, the primary sub-picture is accorded higher priority. The sub-picture composer seeks to keep the entire primary sub-picture and any non-overlapped portion of the secondary sub-picture in the mixed sub-picture frame. An output frame records all modifications from both the primary and secondary sub-pictures. The output frame is initially empty.

Once a decoded primary or secondary sub-picture frame is sent to the sub-picture composer, step 10 is carried out and the start command is activated. Next, step 20 is implemented to determine whether the primary sub-picture or the secondary sub-picture should be updated. If the primary sub-picture is to be updated, step 30 is carried out to determine whether to display or clear the primary sub-picture. If determined as "show", step 40 is carried out to determine if there is a secondary sub-picture. If determined as "yes", step 50 is carried out to determine if the primary sub-picture is overlapped by the secondary sub-picture. If determined as "yes", step 60 is implemented to save the overlapped portion of the secondary sub-picture. Step 70 is then implemented to draw the primary sub-picture on the output frame. As a result, the primary sub-picture and that portion of the secondary sub-picture that does not overlap the primary sub-picture are displayed on the output frame.

Returning to step 50, if the selected primary sub-picture is not overlapped by the existing secondary sub-picture, step 70 is then carried out to draw the primary sub-picture. Here, the entire primary and secondary sub-pictures are mixed and displayed on the output frame.

Returning to step 40, if there is no secondary sub-picture, step 70 is then carried out to draw the primary sub-picture. In this case, only the primary sub-picture is displayed on the output frame.

Returning to step 30, if determined as "clear", step 80 is carried out to clear the existing primary sub-picture from the mixed sub-picture frame. Step 90 is then carried out to determine whether there is an overlapped portion of the secondary sub-picture to be saved. If determined as "yes", the overlapped portion of the secondary sub-picture will be visible again since the primary sub-picture was cleared. Next, step 100 is carried out to restore the overlapped portion of the secondary sub-picture. As a result, the output frame contains only the secondary sub-picture.

Returning to step 90, if "no" is decided on restoration of the overlapped secondary sub-picture, the sequence ends. The output frame contains only the secondary sub-picture, if any, or is empty.

Returning to step 20, if the secondary sub-picture is updated, step 110 is carried out to determine whether the secondary sub-picture should be cleared or shown. If determined as "clear", step 120 is carried out thereby clearing the secondary sub-picture. The output frame contains only the primary sub-picture, if any, or is empty.

If the determination of step 20 is to show the secondary sub-picture, step 130 is carried out to determine if a primary sub-picture exists. If determined as "no", step 140 is carried out to draw the secondary sub-picture. Hence, only the secondary sub-picture is displayed on the output frame.

Returning to step 130, if determined as "yes", step 150 is carried out to determine if the secondary sub-picture overlaps the primary sub-picture. If step 130 is determined as "no", step 140 is carried out to draw the secondary sub-picture. Here, both the primary sub-picture and the secondary sub-picture are displayed on the output frame. If determined as "yes" at step 150, step 160 is then carried out to save any portion of the secondary sub-picture that overlaps the primary sub-picture. Lastly, step 140 is carried out to draw the non-overlapped portion of secondary sub-picture. In this case, the primary sub-picture and any portion of the secondary sub-picture not overlapped with the primary sub-picture are displayed on the output frame.

In sum, utilization of this displaying logic nets the best method for displaying both primary and secondary sub-pictures.

Figure 8:
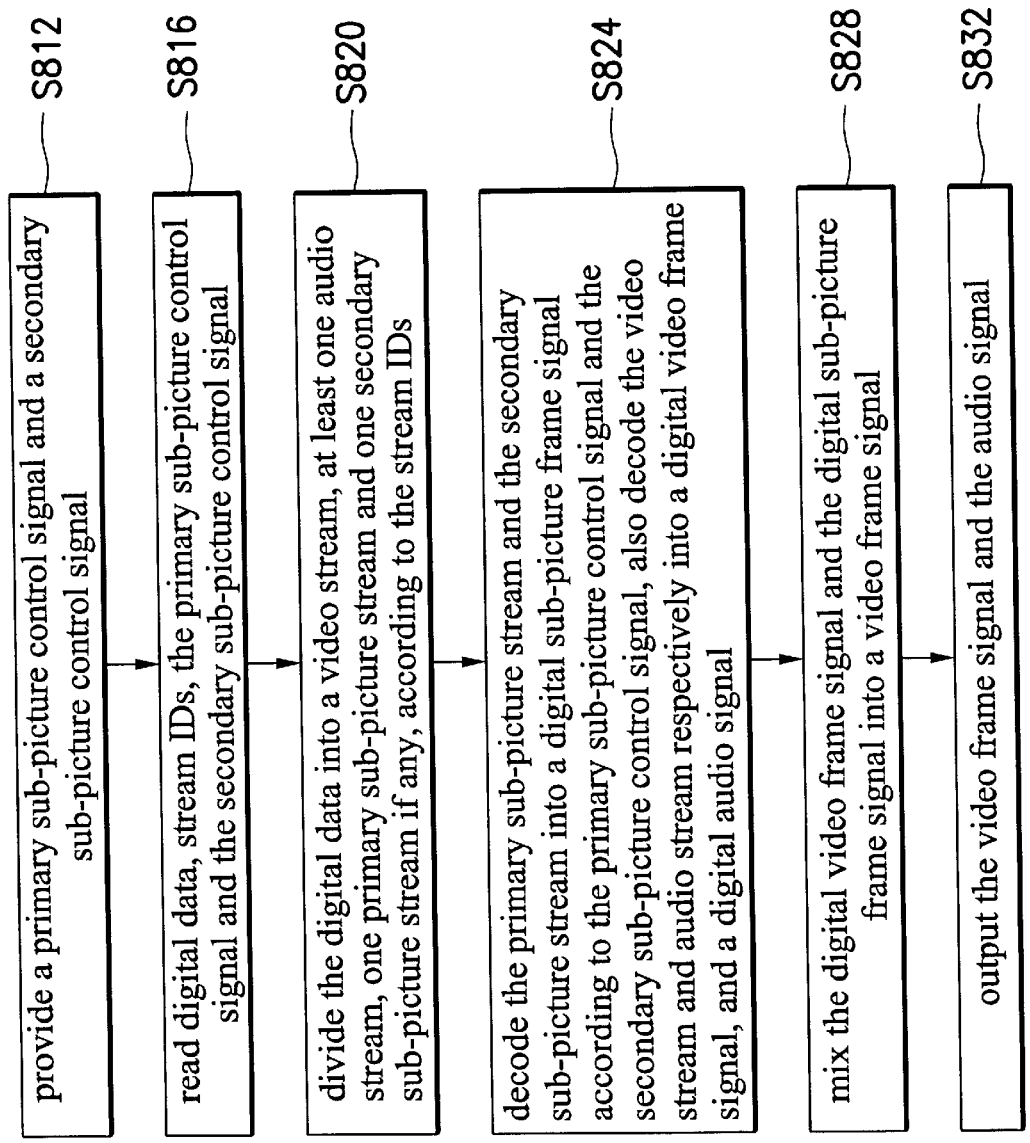
FIG. 8 represents the steps of the DVD playback method in the DVD playback system of the present invention.

The present invention also provides a playback method for a DVD playback system capable of playing two sub-pictures. FIG. 8 illustrates the steps of the DVD playback method as follows:

First, step S812 is carried out to provide a primary sub-picture control signal and a secondary sub-picture control signal. Next, step S816 is carried out to read digital data, stream IDs, the primary sub-picture control signal SP1 and the secondary sub-picture control signal SP2.

Step S820 follows wherein the digital data is divided into a video stream(s), audio stream(s) and sub-picture stream(s) according to stream IDs. Among these various streams, title setting and user definition determine which streams should be used for decoding and display.

Step S824 comes next wherein the primary sub-picture stream and the secondary sub-picture stream are decoded and outputted as the primary and secondary sub-picture frames respectively. The primary and secondary sub-picture frames are then mixed into a single sub-picture frame. Meanwhile, the video stream is decoded as the digital video frame signal and the audio stream is decoded as the digital audio signal.

In subsequent step S828, the video frame and the sub-picture frame (which contains both the primary and secondary sub-pictures), are mixed together as a single video frame.

Finally, in step S832, video and audio outputs are processed.

Following is a description of the control method for the primary and secondary sub-pictures in the playback method of the DVD system capable of playing two of sub-pictures.

Figure 9:
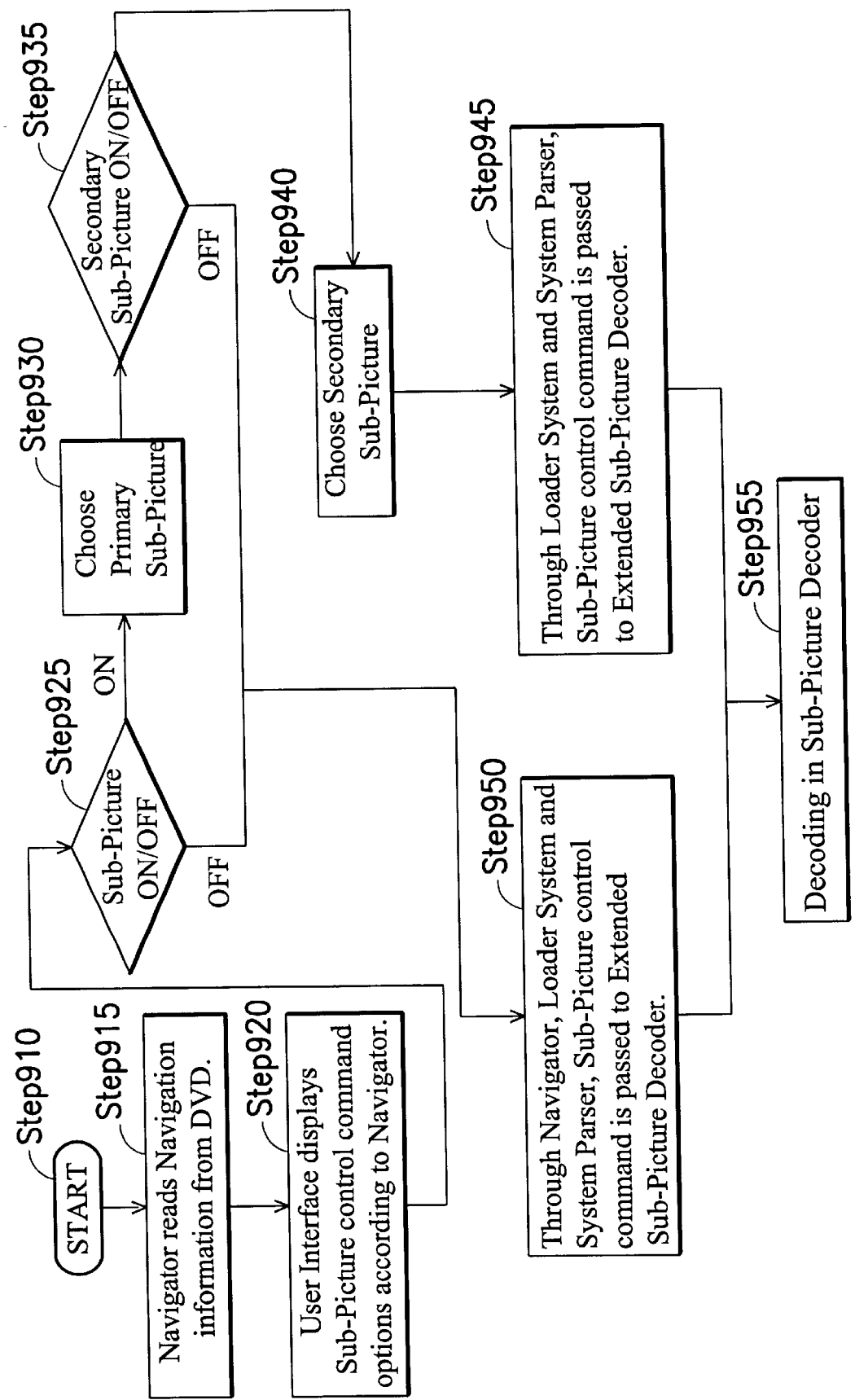
FIG. 9 represents a flow chart of the control process of the primary and secondary sub-pictures found in the DVD playback system of the present invention.

FIG. 9 demonstrates the controlling process of the primary and secondary sub-pictures of the DVD playback system of the present invention. To begin, step 910 activates the start command. Step 915 follows wherein the Navigator reads Navigation information from the DVD. The Navigation information includes the number of audio and streams a user can select, the attributes for each stream and how to represent these streams. In Step 920, a user interface presents available user options according to the navigation information read at Step 915. Step 925 determines if the sub-picture should be enabled. If enabled, step 930 is carried out whereby a primary sub-picture is chosen. Step 935 is next and determines whether a secondary sub-picture should be enabled. If enabled, both the primary and secondary sub-pictures are enabled. Step 945 follows and allows both primary and secondary sub-picture control signals SP1 and SP2 to be input to the system parser through the navigator and the loader systems. The two sub-picture control signals, SP1 and SP2, are mixed as a sub-picture control signal SP to be inputted to the system parser as a sub-picture control signal SP and sequentially output to the sub-picture decoder.

As step 955 is carried out, the sub-picture decoder, using the sub-picture control signal SP, decodes the primary and secondary sub-pictures.

Returning to step 935, if the secondary sub-picture is disabled, step 950 passes the primary sub-picture control signal SP1 to the sub-picture decoder via the navigator, loader system and system parser. Here, step 955 proceeds, enabling decoding of the primary sub-picture by the sub-picture decoder based on sub-picture control signal SP.

Finally, returning to step 925, if the sub-picture is not opened, step 950 is carried out whereby decoding of the primary and secondary sub-pictures by the sub-picture decoder is disabled based on the sub-picture control signal.

While the invention has been described by way of example and in terms of the preferred embodiment, it is to be understood that the invention is not limited to the disclosed embodiments. On the contrary, it is intended to cover various modifications and similar arrangements as would be apparent to those skilled in the art. Similarly, any process steps described herein may be interchangeable with other steps in order to achieve the same result. Therefore, the scope of the appended claims should be accorded the broadest interpretation so as to encompass all such modifications and similar arrangements, which is defined by the following claims and their equivalents.

What is claimed is:

1. A multimedia DVD playback system, capable of playing two kind of sub-pictures, suitable for a DVD storage media, comprising:

an user interface control unit, for receiving a primary sub-picture control signal and a secondary sub-picture control signal;

a loader system, for reading digital data and stream IDs from the DVD storage media, the primary sub-picture control signal and the secondary sub-picture control signal;

a system parser, according to the stream IDs divides the digital data into a video stream, at least one audio stream, one primary sub-picture stream and one secondary sub-picture stream respectively if any;

a decoding module, decoding the video stream into a digital video signal, the audio stream into a digital audio signal, and the primary and the secondary sub-picture streams into a digital sub-picture signal comprising a digital primary sub-picture signal and a digital secondary sub-picture signal according to the primary sub-picture control signal and the secondary sub-picture control signal;

a video/sub-picture composer, for mixing the digital video signal and the digital sub-picture signal;

a video output module, for outputting the mixed digital video signal and the sub-picture signal; and an audio output module, for outputting the digital audio signal.

2. As the system claimed in claim 1, wherein, the decoding device comprising:

a video decoder, for decoding the video stream;

a sub-picture decoder, for decoding the primary sub-picture stream and the secondary sub-picture stream; and an audio decoder, for decoding the audio stream.

3. As the system claimed in claim 2, wherein, the sub-picture decoder comprising:

a control unit, for receiving the primary sub-picture control signal and the secondary sub-picture control signal;

a primary sub-picture decoder, for decoding the primary sub-picture stream;

a secondary sub-picture decoder, for decoding the secondary sub-picture stream;

a secondary sub-picture frame modifier, for adjusting the displaying position of the secondary sub-picture in the sub-picture frame; and a sub-picture composer, for adjusting the displaying mode of the primary sub-picture and the secondary sub-picture.

4. A multimedia DVD playback system, capable of playing two kinds of sub-pictures, suitable for a DVD storage media, comprising:

an user interface control unit, for receiving a primary sub-picture control signal and a secondary sub-picture control signal;

a navigator, for receiving the primary sub-picture control signal;

a loader system, for reading digital data and stream IDs from the DVD storage media, the primary sub-picture control signal and the secondary sub-picture control signal;

a system parser, according to the stream IDs divides the digital data into a video stream, at least one audio stream, one primary sub-picture stream and one secondary sub-picture stream, if any;

a decoding module, decoding the video steam into a digital video signal, the audio stream into a digital audio signal, and the primary and the secondary sub-picture streams into a digital sub-picture signal comprising a digital primary sub-picture signal and a digital secondary sub-picture signal according to the first sub-picture control signal and the secondary sub-picture control signal;

a video/sub-picture composer, for mixing the digital video signal and the digital sub-picture signal;

a video output module, for outputting the mixed digital video signal and the sub-picture signal; and an audio output module, for outputting the digital audio signal.

5. As the device claimed in claim 4, wherein, the decoding system comprising:

a video decoder, for decoding the video stream;

a sub-picture decoder, for decoding the primary sub-picture stream and the secondary sub-picture stream; and an audio decoder, for decoding the audio stream.

6. As the system claimed in claim 5, wherein, the sub-picture decoder comprising:

a control unit, for receiving the primary sub-picture control signal and the secondary sub-picture control signal;

a primary sub-picture decoder, for decoding the primary sub-picture stream;

a secondary sub-picture decoder, for decoding the secondary sub-picture stream;

a secondary sub-picture frame modifier, for adjusting the displaying position of the secondary sub-picture in the sub-picture frame;

a sub-picture composer, for adjusting the displaying mode of the primary sub-picture and the secondary sub-picture.

7. A DVD playback method capable of playing two kinds of sub-pictures at the same time, comprising the following steps:

provide a primary sub-picture control signal and a secondary sub-picture control signal;

read a digital data, a stream IDs, said primary sub-picture control signal and said secondary sub-picture control signal;

divide said digital data into a video stream, at least one audio stream, one primary sub-picture signal and one secondary sub-picture stream, according to said stream IDs;

decode said primary sub-picture stream and said secondary sub-picture stream into a digital sub-picture frame signal according to said primary sub-picture control signal and secondary sub-picture control signal, also decoding said video stream and audio stream respectively into a digital video frame signal, and a digital audio signal;

mix said digital video frame signal and said digital sub-picture frame signal into a video frame signal;

output said video frame signal and said digital audio signal.

8. As the method described in claim 7, wherein, said method for decoding the sub-picture stream comprising:

enable decoding of said primary sub-picture stream and secondary sub-picture stream according to the primary sub-picture signal and the secondary sub-picture signal;

decode the primary sub-picture stream into a digital primary sub-picture signal, also decoding the secondary sub-picture stream into a digital secondary sub-picture signal;

adjust the displaying position of said digital secondary sub-picture signal according to the length and the width of said digital secondary sub-picture signal and the displaying position of said digital primary sub-picture signal;

mix said digital primary sub-picture signal and secondary sub-picture signal are mixed into a digital sub-picture frame signal; and output the digital sub-picture frame signal.

* * * * *